Jan. 1, 1924. 1,479,489
J. E. ZOMNIR
MACHINE FOR ASSEMBLING BOOK MATCHES
Filed Aug. 8, 1922 12 Sheets-Sheet 1
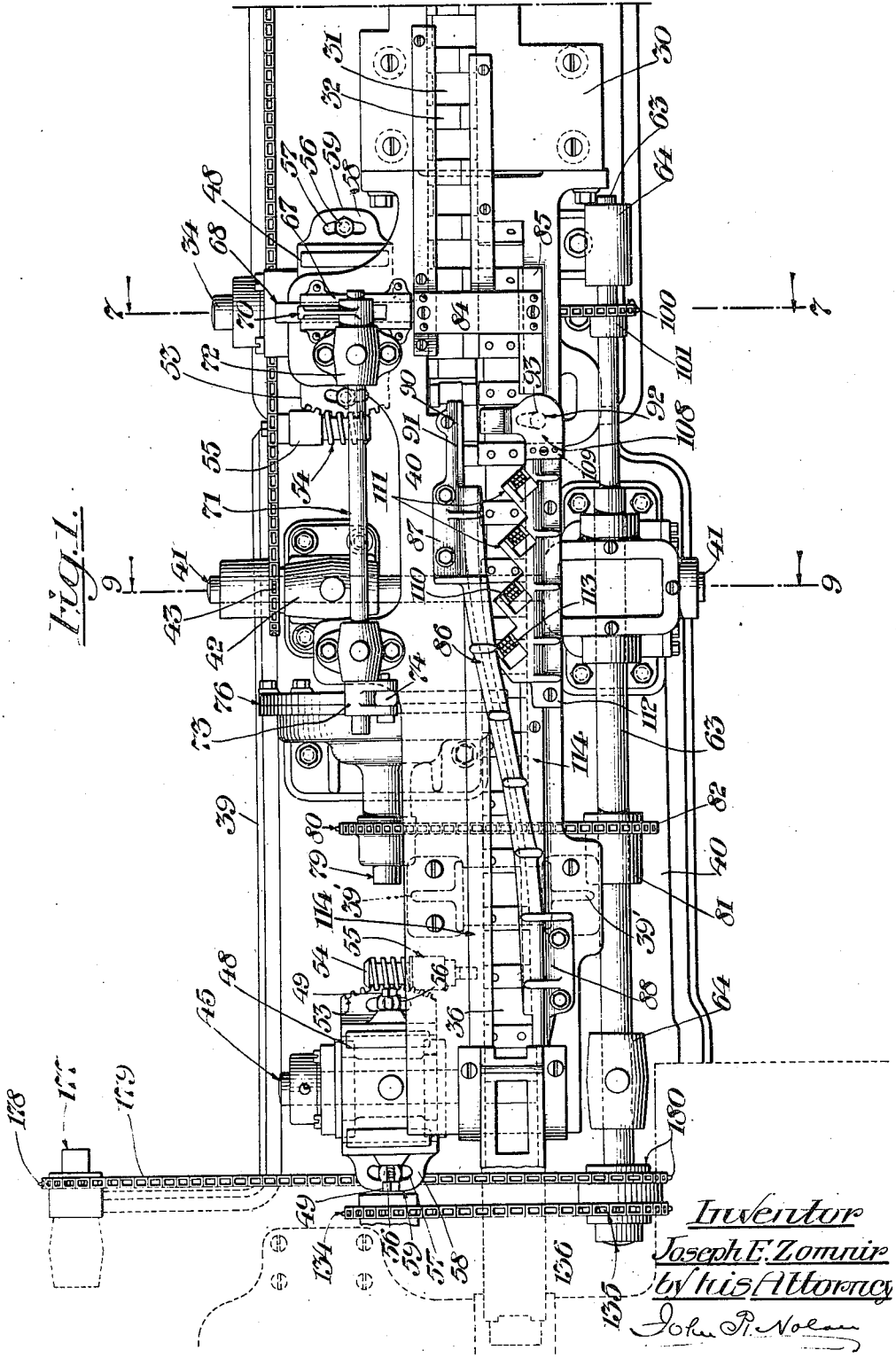

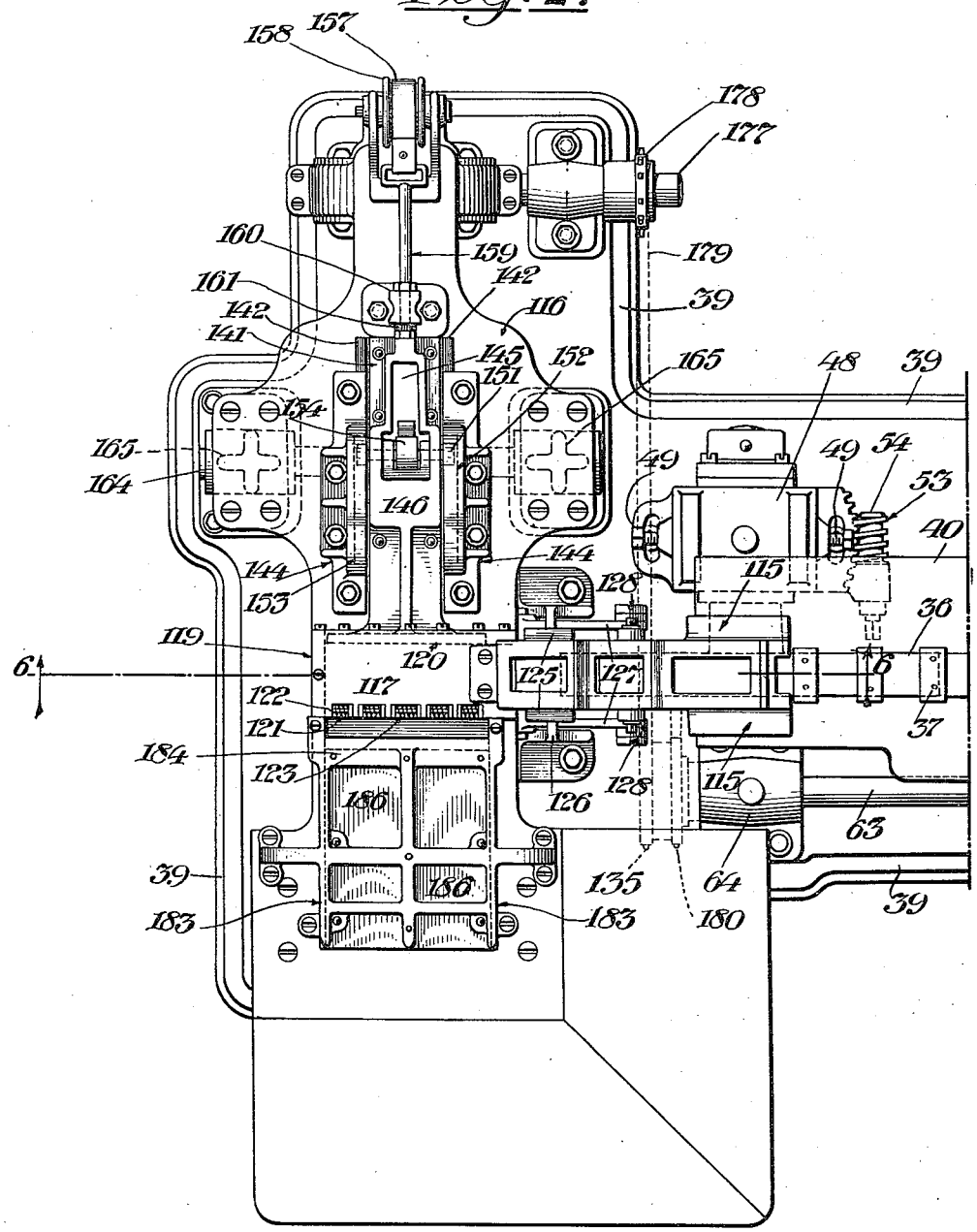

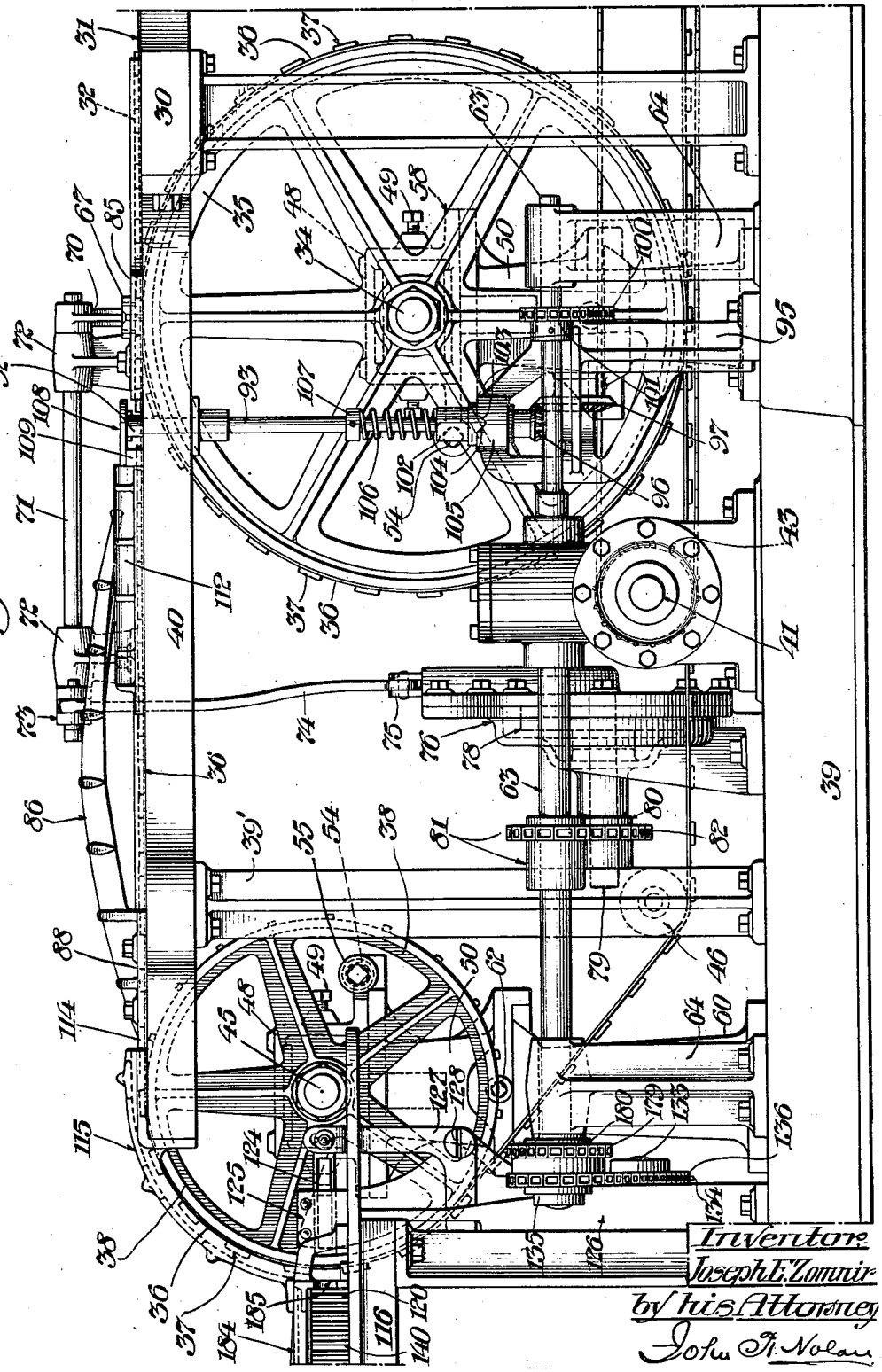

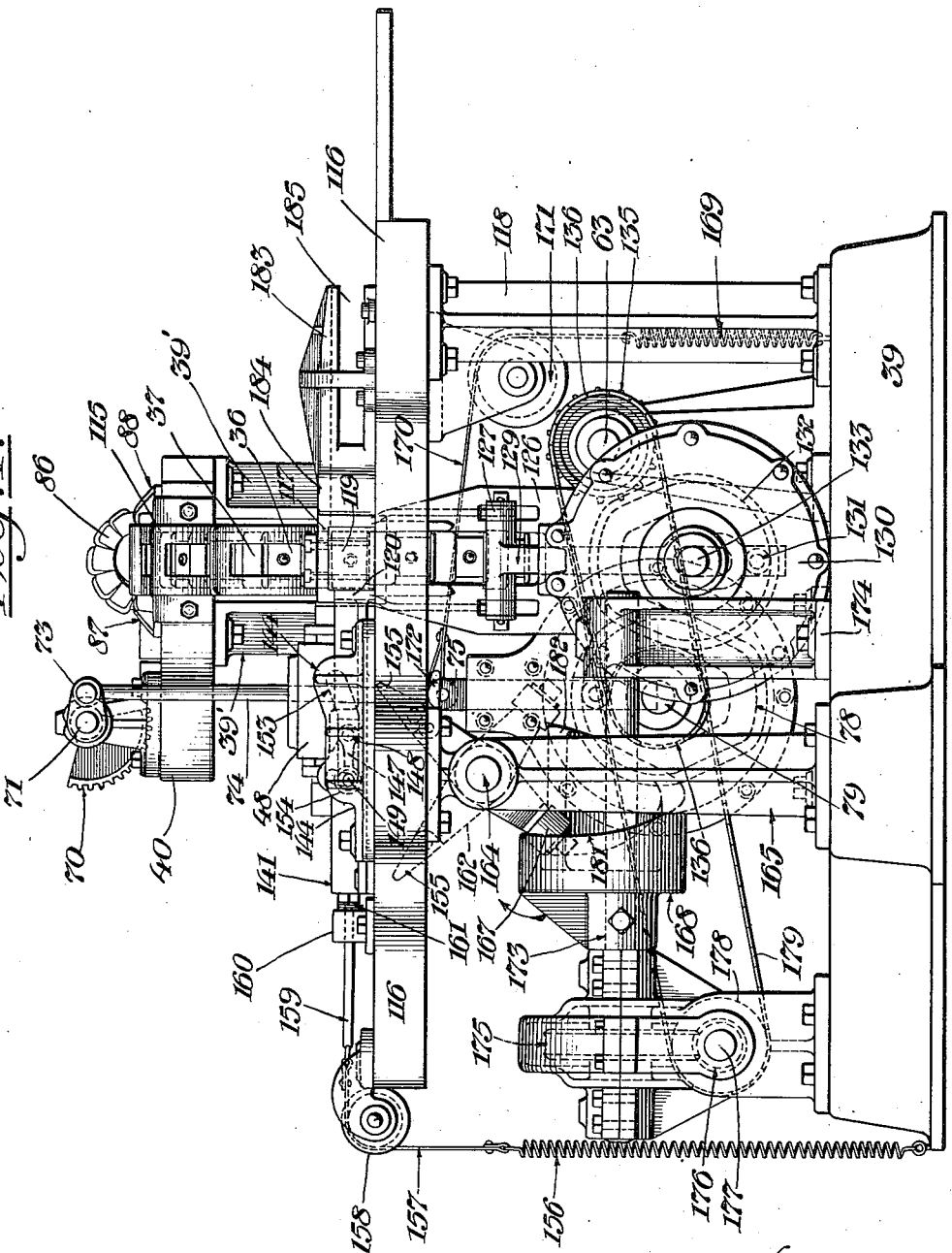

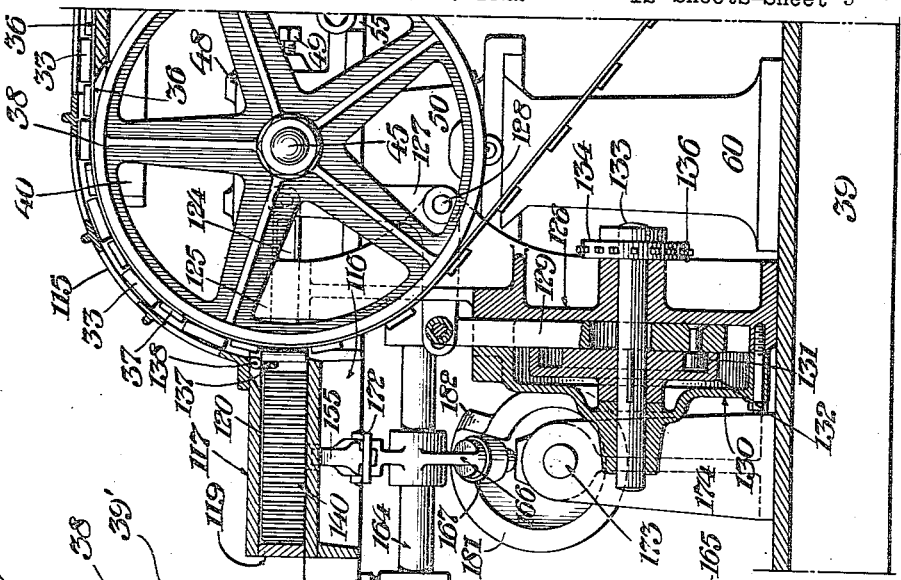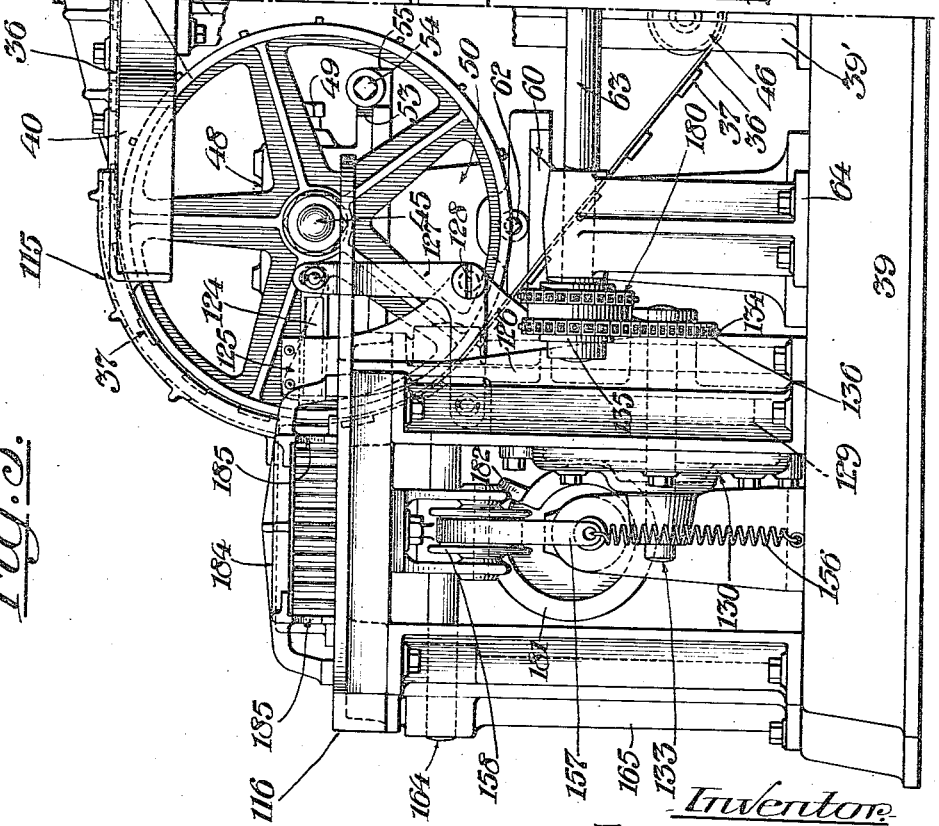

Jan. 1, 1924. 1,479,489
J. E. ZOMNIR
MACHINE FOR ASSEMBLING BOOK MATCHES
Filed Aug. 8, 1922 12 Sheets-Sheet 6
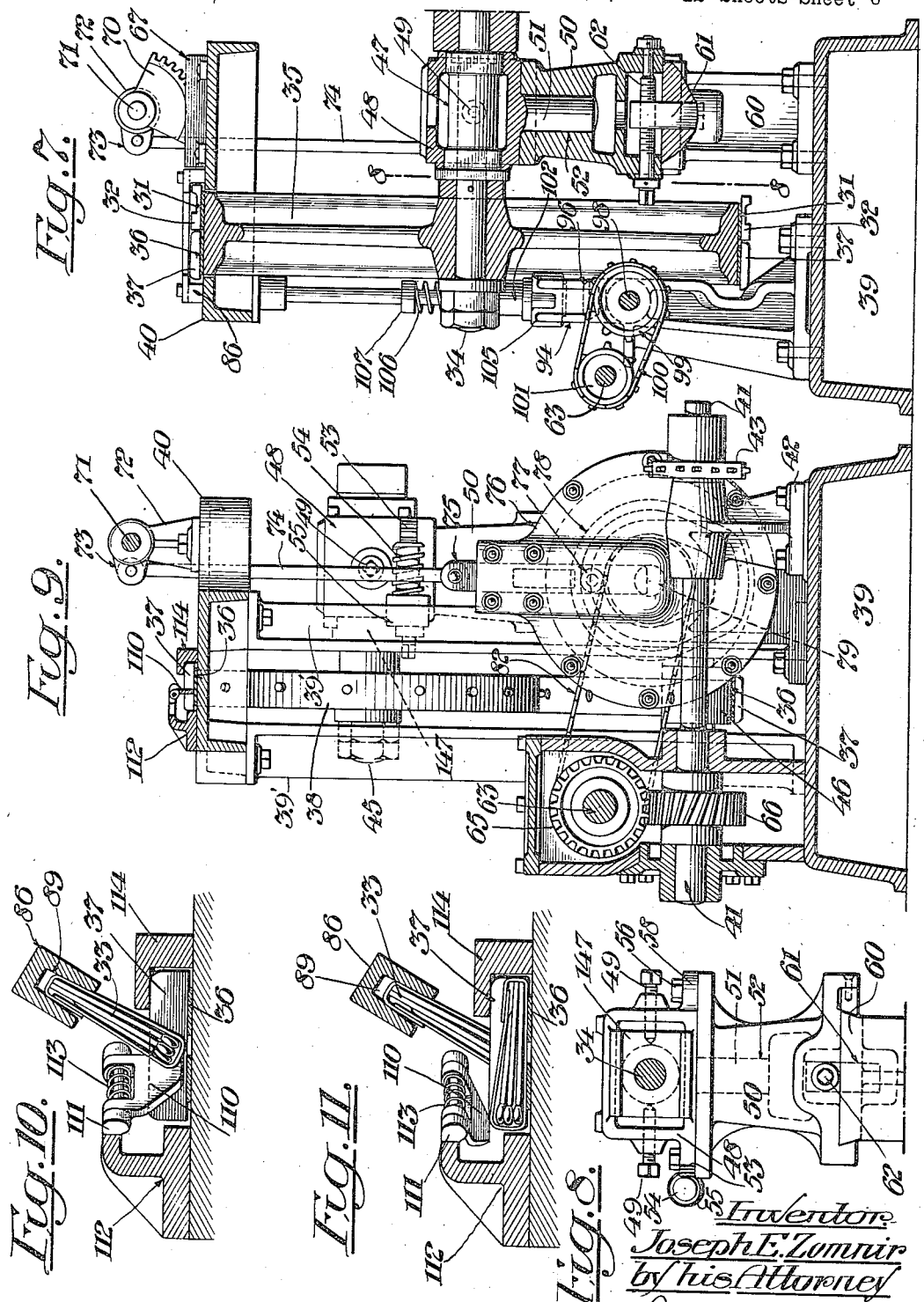
Inventor
Joseph E. Zomnir
by his Attorney
John F. Nolan

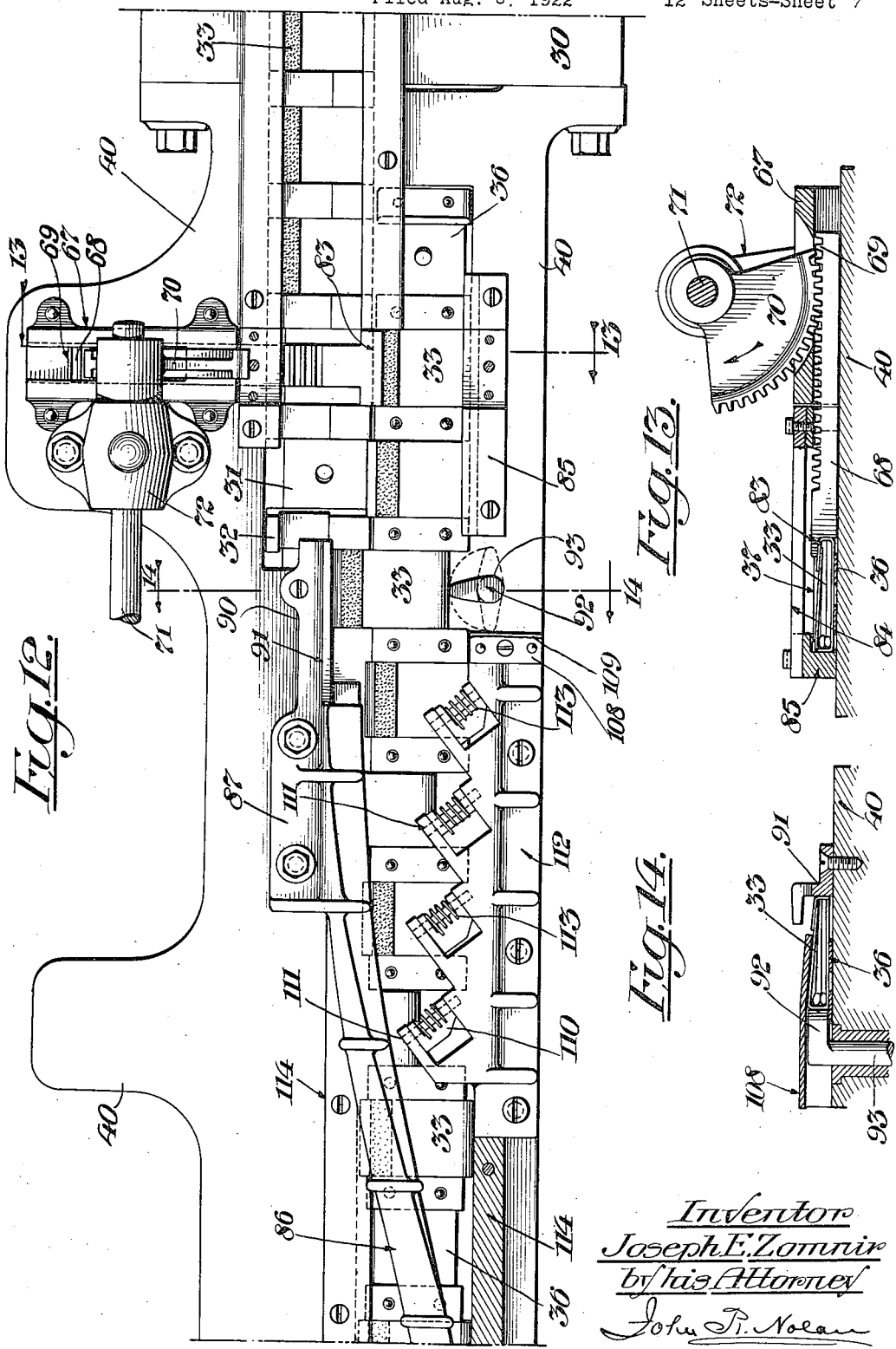

Jan. 1, 1924
J. E. ZOMNIR
1,479,489
MACHINE FOR ASSEMBLING BOOK MATCHES
Filed Aug. 8, 1922   12 Sheets-Sheet 8
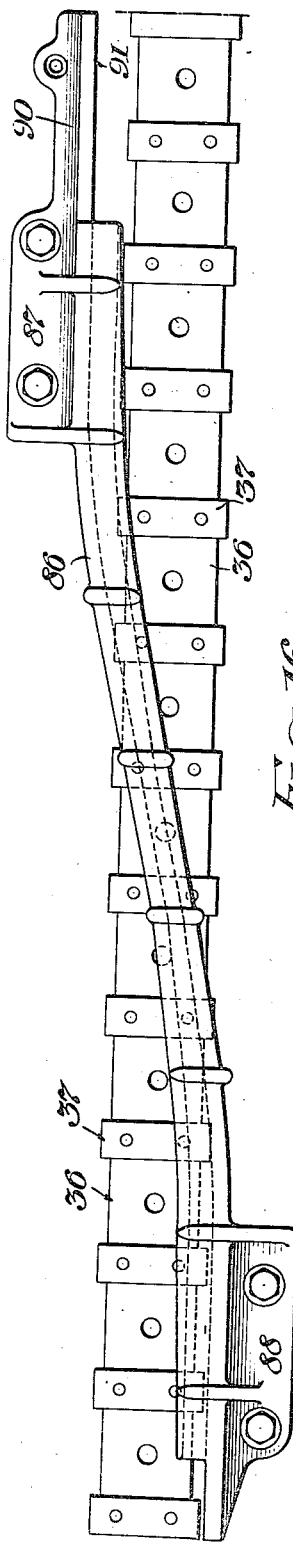
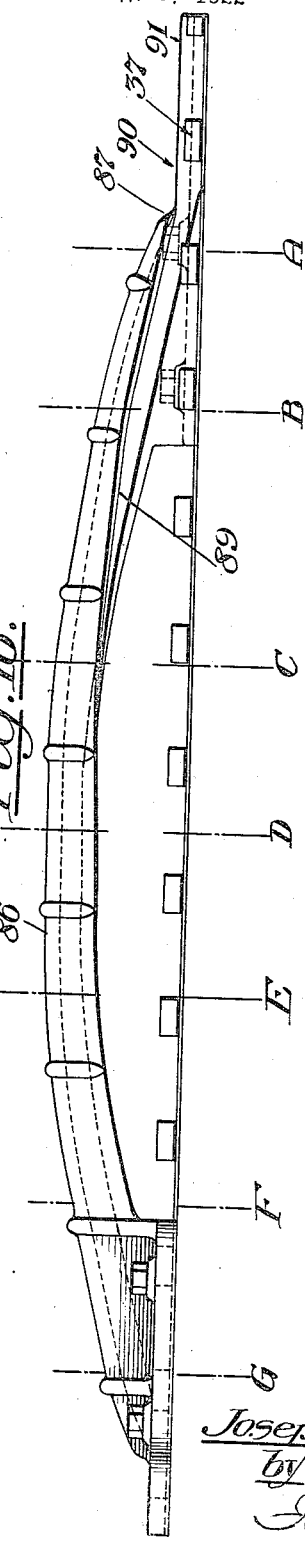
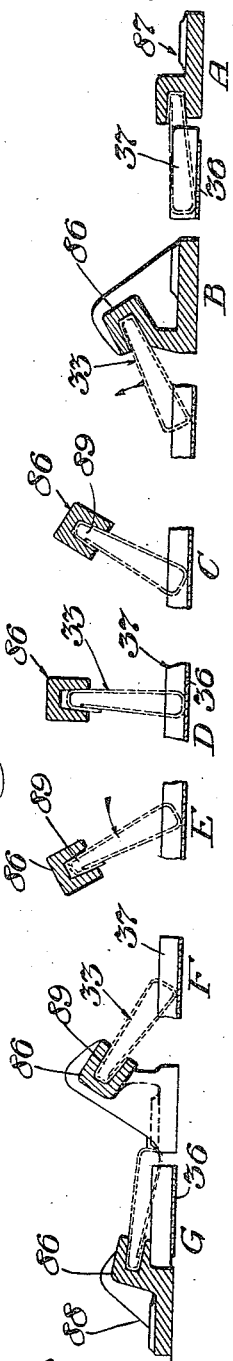
Inventor
Joseph E. Zomnir
by his Attorney
John P. Nolan

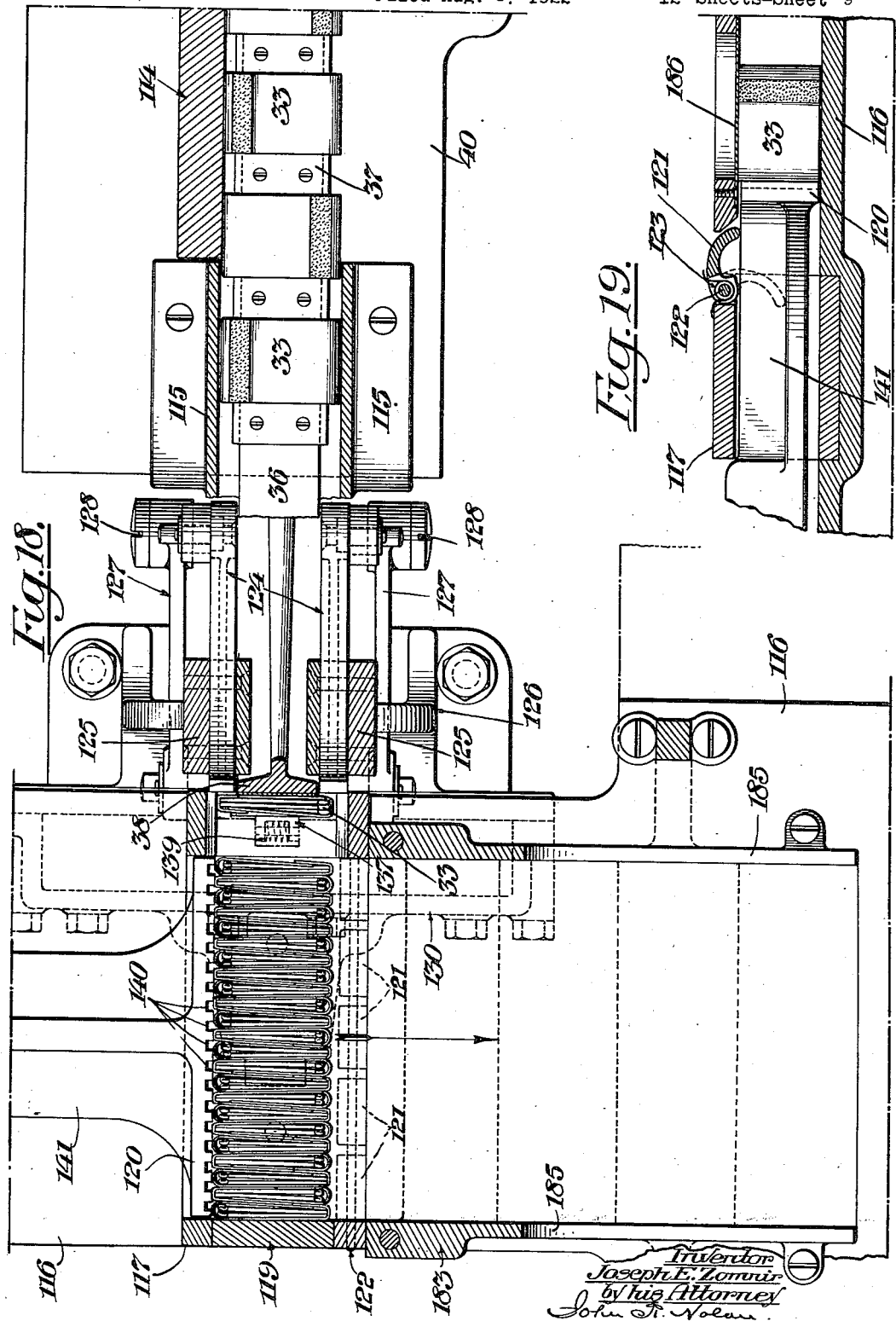

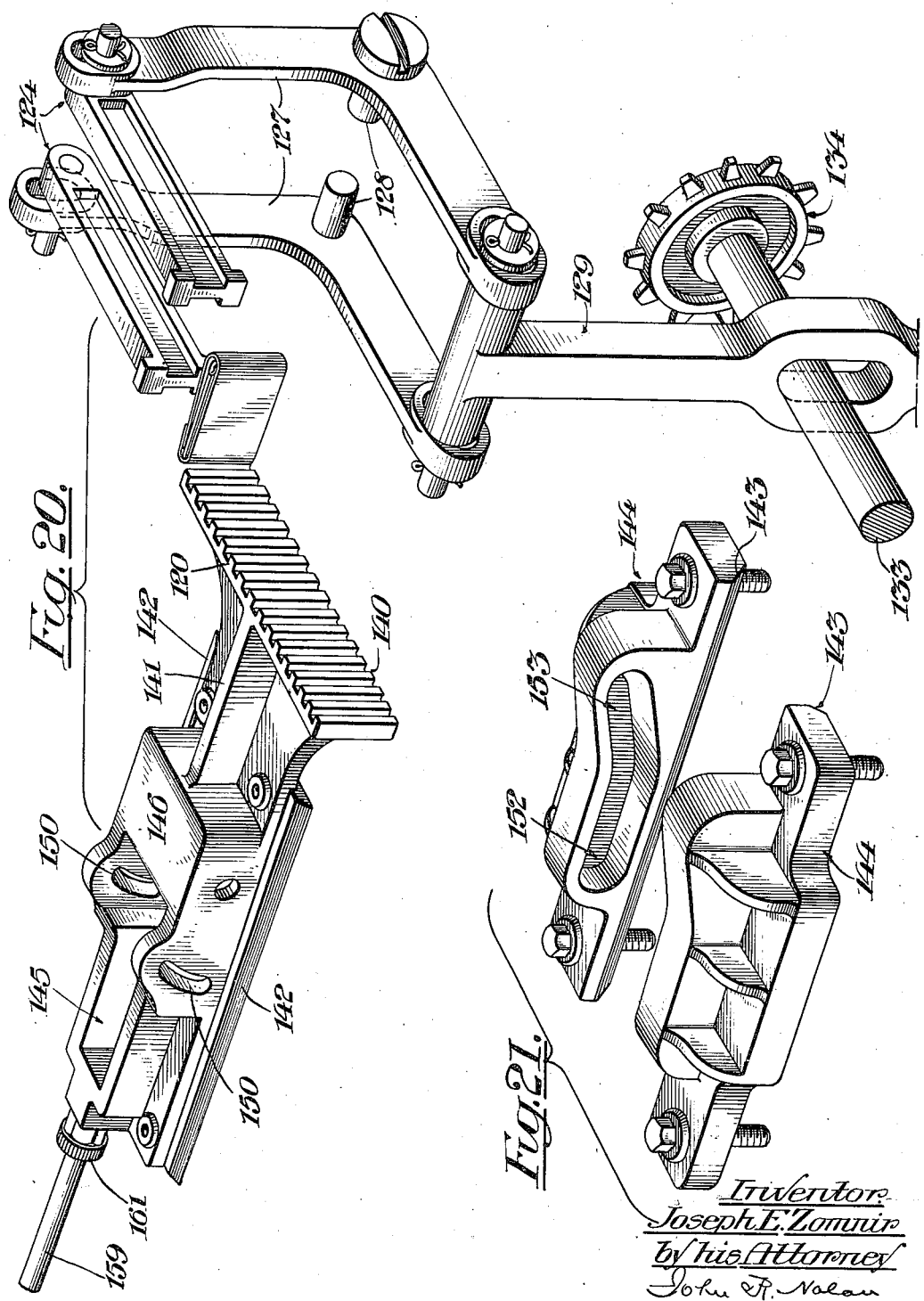

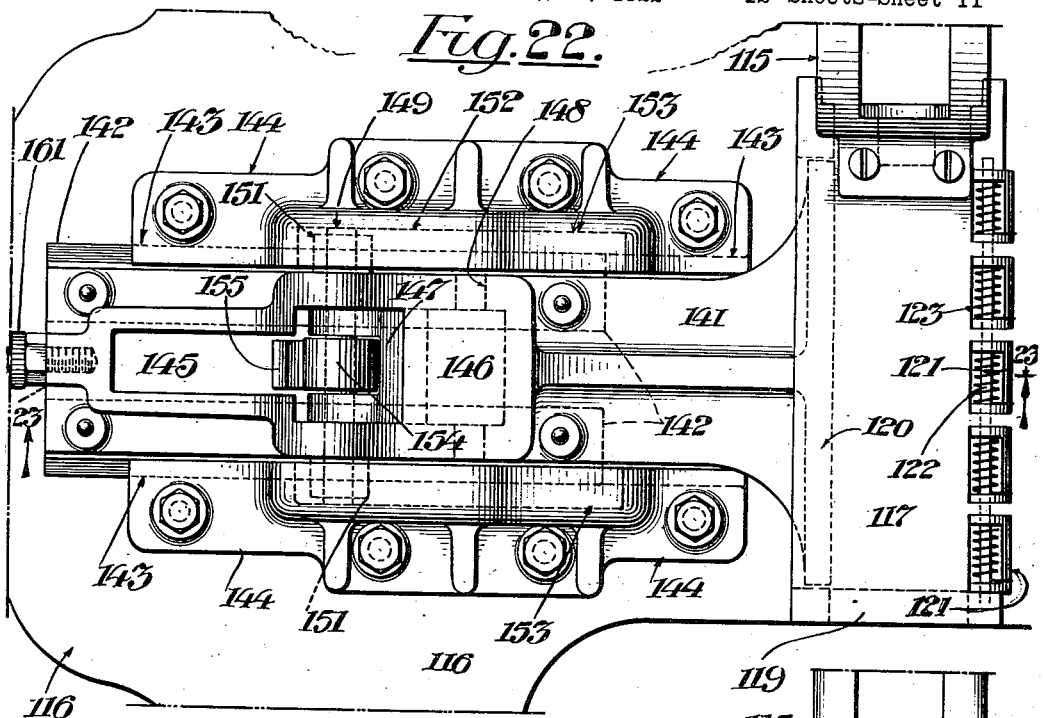
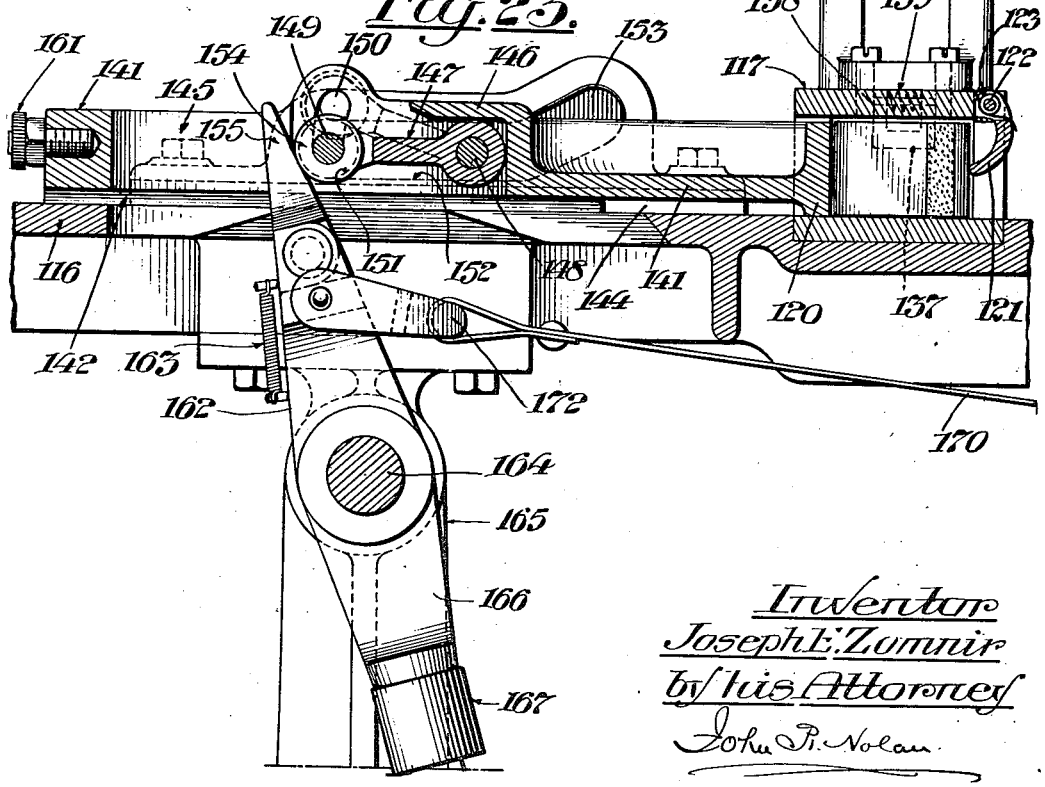

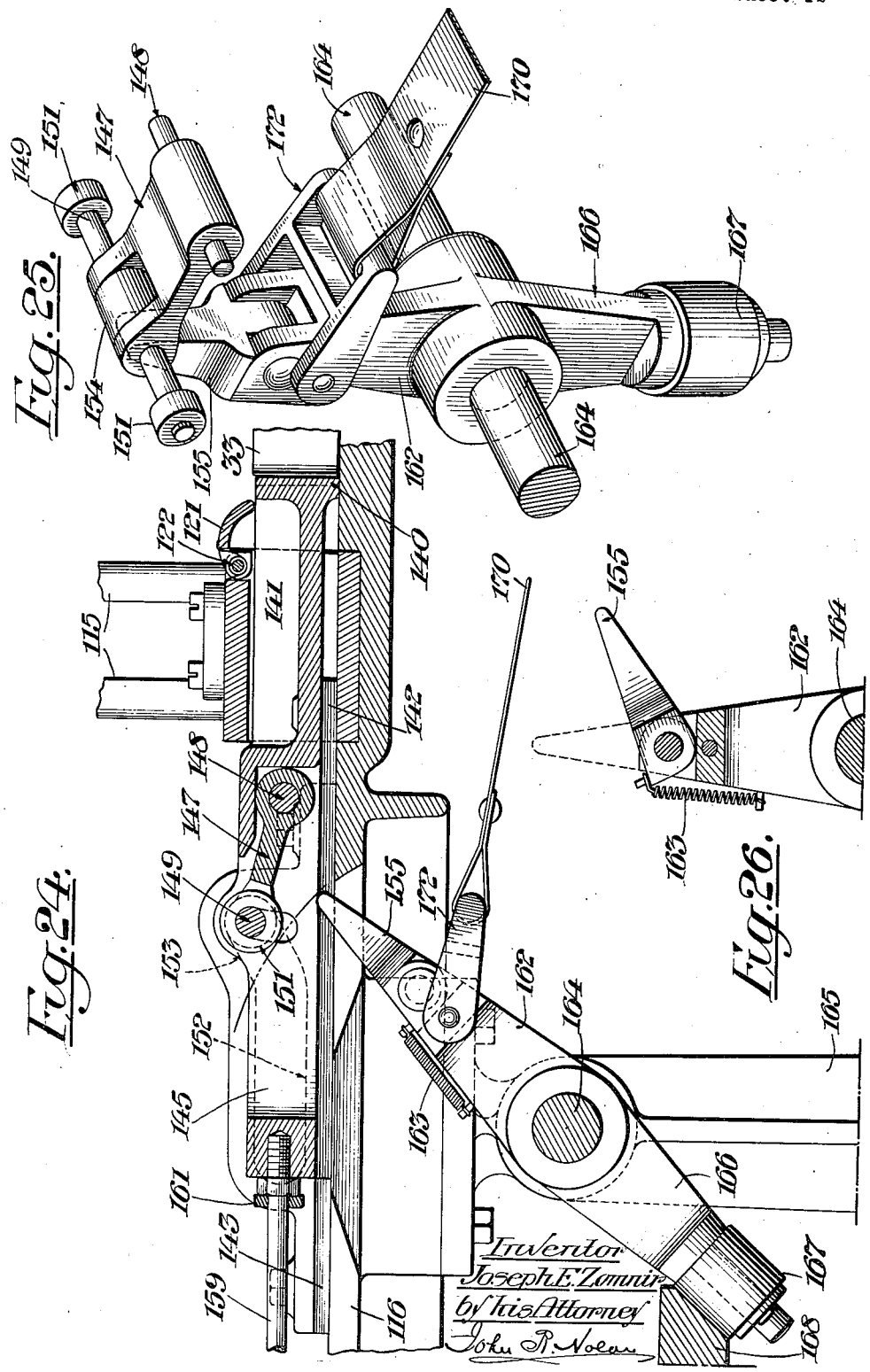

Patented Jan. 1, 1924.

1,479,489

UNITED STATES PATENT OFFICE.

JOSEPH E. ZOMNIR, OF NEW YORK, N. Y., ASSIGNOR TO THE DIAMOND MATCH COMPANY, OF CHICAGO, ILLINOIS, A CORPORATION OF ILLINOIS.

MACHINE FOR ASSEMBLING BOOK MATCHES.

Application filed August 8, 1922. Serial No. 580,551.

*To all whom it may concern:*

Be it known that I, JOSEPH E. ZOMNIR, a citizen of the United States, and resident of the city of New York, borough of Richmond, in the county of Richmond and State of New York, have invented certain new and useful Improvements in Machines for Assembling Book Matches, of which the following is a specification.

This invention relates to machines for assembling book or card matches and the like in succeeding rows in order to facilitate the operation of packing them uniformly and compactly in suitable containers; and the invention has for its object to provide a machine of simple and efficient construction and operation whereby the articles are rapidly arranged side by side with the larger and thinner ends of adjacent articles in opposite relation to each other.

The invention is especially though not exclusively designed for use in connection with or as an attachment to the book-match making machine described in Letters Patent of the United States No. 1,073,394, dated September 16, 1913, to which reference may be had.

The invention comprises various features of construction and organization, and principles of operation, which will be hereinafter described and claimed.

In the drawings—

Figures 1 and 2 represent a plan of a book-match assembling machine embodying a preferred form of my invention.

Fig. 3 is a side elevation of the mechanism shown in Fig. 1.

Fig. 4 is an end elevation of the mechanism shown in Fig. 2.

Fig. 5 is a side elevation of the mechanism shown in Fig. 2.

Fig. 6 is a vertical section on a plane through the assembling chamber, as on the line 6—6 of Fig. 2.

Fig. 7 is a vertical section on a plane through the mechanism for transferring the books from the conveyer of the book match machine to the conveyer of the assembling machine, showing also the adjustable bearing devices for the shaft of the double-face wheel for the two conveyers, as on the line 7—7 of Fig. 1.

Fig. 8 is a sectional detail through said shaft, as on the line 8—8 of Fig. 7.

Fig. 9 is a vertical section on a plane through the drive mechanism, showing the connections for actuating the book-transfer slide, and also showing the receiving portion of the cam bar for reversing alternate books on the conveyer of the assembling machine, as on the line 9—9 of Fig. 1.

Fig. 10 is a transverse section through the said cam bar and adjuncts in a vertical plane slightly beyond that shown in Fig. 9, the adjacent resilient stop member being indicated as engaging the lower end of an inclined book on the conveyer.

Fig. 11 is a similar section showing the inclined book farther advanced, and the stop member as riding idly upon the next succeeding book on the conveyer.

Fig. 12 is a plan of the receiving end of the assembling machine, showing the adjacent portions of the two conveyers and the transfer mechanism co-operating therewith; also the receiving portion of the cam bar, and the rotating finger for shifting alternate books into a position to engage the bar; together with the resilient stop devices for the books engaged by the bar.

Fig. 13 is a transverse section through the transfer slide and adjuncts, as on the line 13—13 of Fig. 12.

Fig. 14 is a similar section on a plane through the book-shifting finger, showing its action on an opposing book, as on the line 14—14 of Fig. 12.

Fig. 15 is a plan of the cam bar, showing its relation to the conveyer of the assembling machine.

Fig. 16 is a side elevation of the said cam bar and the adjacent portion of the conveyer.

Fig. 17 is a series of cross-sections taken on succeeding vertical planes from the receiving to the discharging end of the cam bar, as on the lines A to G respectively of Fig. 16, a book being indicated in dotted lines in its various angular positions with relation to the conveyer and bar.

Fig. 18 is a horizontal section in a plane through the assembling chamber, showing the plunger for ejecting the books from the conveyer and entering them into said chamber, and also the plunger for pushing succeeding rows of books from the chamber.

Fig. 19 is a vertical section through said chamber, showing the latter plunger in its forward position.

Fig. 20 is a detached perspective view of the said plungers and adjuncts.

Fig. 21 is a perspective view of the lateral cam brackets for guiding the row discharging plunger and controlling the actuating devices therefor.

Fig. 22 is a plan of said plunger, the cam brackets therefor, and adjuncts.

Fig. 23 is a vertical section on the line 23—23 of Fig. 22, showing the parts in their relative positions at the instant the row discharging plunger is about to be advanced.

Fig. 24 is a similar section, but showing the parts in their relative positions when the plunger is fully advanced.

Fig. 25 is a detached perspective view of the trigger lever and adjuncts for actuating the row-discharging plunger.

Fig. 26 is a section through the upper arm of the trigger lever showing the pivoted dog thereon in the position it occupies during the return stroke of the arm.

Referring to the drawings, 30 designates the delivery end of the table of a book-match machine of the general character illustrated in the aforementioned Letters Patent of the United States No. 1,073,394. The endless conveyer 31 upon which the book-matches are formed in the said machine is flexed about suitable wheels at or adjacent the respective ends of the table and is intermittently driven by appropriate mechanism. This conveyer comprises an endless steel band having transverse blocks 32 regularly spaced apart on its outer surface to provide a succession of pockets for flat-lying match books 33, all as fully described in said Letters Patent.

My present invention is associated with the delivery end of the book-match machine, and is designed to receive the successive books therefrom and assemble them side by side in rows, with the larger and thinner ends of the books of each row alternately reversed, for convenience of packing.

The intermittently traveling conveyer of the patented machine is extended somewhat beyond the end of the table 30, the bearings for the shaft 34 of the proximate wheel 35 being suitably located to accommodate the extension. When each successive pocket of the upper run of the conveyer reaches the top of the wheel 35, the book contained in such pocket is transferred into the pocket of an adjacent run of a second conveyer 36 constituting a part of the assembling machine. The conveyer 36 is similar in construction to the conveyer 31, that is, it comprises an endless steel band having transverse blocks 37 regularly spaced apart on its outer surface to provide a succession of pockets. The conveyer 36 is flexed about a pair of wheels one of which is indicated at 38. The other wheel is conveniently affixed to or made an integral part of the wheel 70 35 so as to travel concurrently therewith, and hence the two conveyers move concertedly to insure the alinement of the pockets of one with those of the other conveyer, at the top of the wheel 35, thereby permitting the transference of the consecutive books from the pockets of the conveyer 31 to those of the conveyer 36, as will be hereinafter described.

The supporting frame for the assembling mechanism comprises a bed 39, standards 39' and a table 40, one end of the table being connected to and constituting, in effect, a continuation of the table 30 of the book-match machine. A shaft 41, which is driven from a suitable source of power, extends transversely of the bed and is journaled in bearings in pedestals 42 rising from the bed. In the present instance the shaft is equipped with a sprocket wheel 43 which is operatively connected with and driven from a similar wheel on a shaft of the book-match machine.

Journaled in suitable bearings 44 beneath the bed 39, and at or near the left hand end of the latter, is a transversely extending shaft 45 upon which is fixed the wheel 38 above referred to about which the conveyer 36 is flexed. The upper peripheral portion of this wheel 38, and that of the companion wheel 35 travel in a plane substantially flush with the top of the table 40, the latter having suitable openings therein for the passage of the wheels. A suitably-disposed idler 46 guides the lower run of the conveyer and maintains the upper run thereof taut upon the top of the table.

The bearing for each of the shafts 34, 45 is made variably adjustable in order that accurate alinement of the upper runs of the conveyers can be effected, and also to compensate for their longitudinal contraction and expansion on account of changes of temperature. The bearing comprises a journal block 47 slidably fitted for horizontal adjustment in an open rectangular guide-head 48. This head is provided at its ends with oppositely-acting set-screws 49 which, bearing against the opposing ends of said block, afford means whereby the block can be horizontally adjusted longitudinally of the path of the conveyer in order to compensate for the variant length of the conveyer.

Each guide head is pivotally mounted for horizontal rotary movement upon a bracket 50. In the present instance the head has formed thereon a depending pivot stud 51 which is seated in a socket 52 in the top of the bracket. The head has formed thereon at one end a segmental gear rack 53 with which meshes a worm 54 having its bearing in a projection 55 at the adjacent end of the bracket. By properly turning the worm the guide head can be nicely adjusted about its vertical axis to ensure the accurate setting of the shaft at right angles to the longitudinal path of the conveyer.

The head can be securely locked in its predetermined position of adjustment by means of a bolt 56 which passes through the top of the bracket and through an arcuate slot 57 formed in an end extension 58 of the top of the bracket.

The bracket is provided with a basal guide way which is slidably fitted to guides 59 formed on the top of a pedestal 60 rising from the bed 39. The guides are arranged in a horizontal plane at right angles to the path of the upper run of the conveyer in order that the bracket and its appurtenances can be adjusted to effect a lateral setting of the conveyer as occasion may require. Rising from the pedestal into a recess in the bracket 50 is a stud 61 which is transversely bored and threaded to receive a screw rod 62 which is rotatably supported at its ends in the bracket 50. By properly manipulating this screw rod nice adjustment of the bracket horizontally in its guides on the top of the pedestal can be effected. (See Figs. 1, 7 and 8.)

Extending beneath and longitudinally of the table 40, at one side thereof, is a shaft 63 which has its bearings in standards 64 rising from the bed. This shaft is geared with and driven from the shaft 41 by means, for example, of intermeshing spiral gears 65, 66 on the respective shafts; the power being transmitted from the shaft 63 through suitable connections to devices for transferring the book-matches from the conveyer 31 to the conveyer 36, as will now be described.

Slidably mounted in suitably-located guide brackets 67 on the table 40 is a plunger 68 which is reciprocable transversely of the match machine conveyer at the transfer station, so as to engage the book contained in each succeeding pocket of said conveyer and push it endwise into the adjacent pocket of the conveyer 36. The upper surface of the plunger is provided with rack teeth 69 with which engages a sector gear 70 fast on one end of a rock-shaft 71 extending longitudinally of the table 40 and having its bearings in brackets 72 rising from the table. On the opposite end of the shaft is a crank 73 which is connected by means of a link 74 with the upper end of a vertical slide 75 that is supported and guided in one side of a cam casing 76 borne by the bed. The lower end of the slide is provided with a lateral roll 77 which is entered in the race of a face cam 78 rotatable within the casing. This cam is fast on a stud-shaft 79 having its bearing in the wall of the casing and being provided with a sprocket wheel 80 which is connected with a similar wheel 81 on the shaft 63 by means of a chain 82. Hence continuous motion is transmitted from the shaft 63 to the shaft 79 and the cam 78 on the latter. The contour of the cam race is such that the slide 75 is reciprocated at certain intervals and the rock-shaft and its sector are thus periodically actuated in a manner to advance and retract the plunger in each dwell of the conveyers, the plunger in its forward stroke impinging against the opposing book and pushing it directly from the conveyer 31 into the conveyer 36. To ensure the guidance of the book while it is being transferred, the acting end of the plunger is preferably provided with a lip 83 which overhangs the thinner end of the book; and a bridge piece 84 is arranged to overhang the path of the book in its movement. A suitably-located bar 85 at the outer edge of the conveyer 36 serves as an end stop and guide for each book when it is transferred into the conveyer. (See Figs. 3, 7, 12, 13 and 19.) As the two conveyers progress, each succeeding pocket of the conveyer 36 is supplied with a flat-lying book whereof the larger end is forward.

As a simple and efficient means to reverse the alternate books borne by the conveyer 36, and thus dispose them with their larger ends in opposite relation to those of the other books in the conveyer, I provide an elongated turning element which diagonally overhangs the path of travel of the upper run of the conveyer and is so constructed as to receive the smaller ends of the alternate books, during their progress on the conveyer, and gradually turn them through an arc of 180 degrees. This element comprises a longitudinally channeled bar 86 which is gradually curved or twisted from one end to the other. The bar terminates in brackets 87, 88 which are bolted to the table 40, one bracket 87 being disposed in spaced relation to the rearward edge of the conveyer in the vicinity of the receiving station, and the other bracket being located adjacent the front edge of the conveyer in the vicinity of the left end of the table. The cam channel 89 of the bar is open at its respective ends and describes generally an elongated spiral-like path whereof the receiving end faces the rearward edge of the conveyer and the opposite end faces the front edge of the conveyer, as viewed in Figs. 1, 15, 16 and 17. The bracket 87 is provided with an extension 90 presenting an offset surface 91 which lies parallel to the upper run of the conveyer and merges with the bottom of the channel.

Means are provided whereby the alternate books contained in the conveyer are partially pushed endwise therefrom in front of and toward the surface 91, during alternate dwells of the conveyer, so that as the conveyer progresses the rearward or smaller ends of such books are caused to enter the mouth of the cam channel and thence are gradually raised and turned completely over by the action of the channel as they advance along the same toward the left hand end of the table. In the turning of the books their smaller ends bear pivotally upon the floors of the respective pockets, and hence when such books reach the end of the table they are positioned in opposite end relation to the intervening books on the carrier. (See Fig. 17.)

The preferred means for pushing the alternate books toward the surface 91 includes a rotary presser finger 92 fast on the upper end of a vertical shaft 93 which has its bearings in the table 40 and in a frame extension 94 of a standard 95 rising from the bed 39. The shaft 93 is intermittently rotated in respect to the movement of the conveyer 36 and the finger on said shaft is so located laterally of the conveyer that the finger in alternate impulses of the shaft, i. e. during intervals of rest of the conveyer, impinges against the outer ends of the alternate books and pushes them toward the surface 91. In the present instance the lower end of the shaft 93 bears a bevel gear wheel 96 in cooperative relation to a mutilated bevel gear wheel 97 fast on a shaft 98 having its bearings in the frame extension 94. On this shaft is a sprocket wheel 99 which is connected by means of a chain 100 with a similar wheel 101 on the driven shaft 63 previously referred to. Thus the shaft 98 and its mutilated gear are continuously rotated, and the teeth of the latter are periodically engaged with and disengaged from the teeth of the wheel 96 in a manner intermittently to rotate said wheel and its shaft 93, together with the finger 92.

The timing of the shaft 93 is such that it makes two intermittent movements in each complete rotation, one of the impulses of the finger being toward and from the conveyer during each alternate dwell of the latter (at which time the finger impinges against the opposing book), and the other impulse being during each intervening dwell of the conveyer (at which time the finger recedes from the adjacent book). In order temporarily to lock the shaft 93 at the end of each rotary impulse thereof, I provide the shaft with a slidable splined sleeve 102 having on its under surface two diametrically-opposite V-teeth 103 which normally engage suitably-disposed V-notches 104 in a boss 105 on the frame extension 94. The sleeve is held yieldingly depressed by means of a spring 106 which, encircling the shaft 93, bears against the sleeve and a collar 107 spaced therefrom on the shaft. The teeth of the sleeve are disengaged against the action of the spring from the notches of the boss by and during each impulse of the shaft, but are engaged with the proximate notches at the end of each impulse of the shaft 93. Overhanging the finger 92 and the book engaged thereby, is a cap plate 108 which is secured to a suitably-disposed block 109 rising from the table. This plate not only serves as a guard to confine the rotating finger but also as a means to prevent upward displacement of the underlying book while it is being acted upon by the finger. (See Figs. 1, 3, 7, 12 and 14.)

In the initial upward movement of the rearward ends of the alternate books by the action of the cam channel there is liability of their displacement forwardly or away from the channel until such an angularity of the books is attained that their outer or smaller ends are well supported by the floors of their respective pockets. To obviate such liability I locate forwardly of the receiving end of the cam bar a series of resilient stop members against which successively the outer ends of the alternate books contact until such time that they reach a proper angular position for support by the conveyer.

Each of these stop members preferably comprises a depending plate 110 pivoted at its upper end between spaced jaws 111 of a bracket structure 112 which is fastened to the table forwardly of the conveyer. The arrangement of the jaws is such that they overhang the conveyer diagonally thereof, so that the depending plate is in angular relation to the path of travel of the books, as shown in Figs. 1 and 12. The free lower end of the plate normally depends into the path of the pockets of the conveyer, being yieldingly so held by a suitably-disposed torsion spring 113 on the pivot pin of the plate, and hence those books which impinge against the opposing lower corner (which is beveled) of the plate swing it outwardly and upwardly against the action of the spring. The plate is thus held until the succeeding pocket containing an outpressed book passes beneath the plate, whereupon the plate automatically resumes its normal or down position within the pocket and directly in front of the outer end of the adjacent book, thus serving effectually as a stop to prevent accidental displacement of the book. Each book under the influence of the cam bar is similarly acted upon by the successive plates until the book reaches the proper angular position in relation to the conveyer, as above mentioned. (See Figs. 10, 11 and 12.)

From the foregoing it will be seen that when the books on the conveyer 36 approach and pass about the wheel 38 the successive books of the row are in opposite endwise relation to each other. In their travel upon the upper run of the conveyer, the books are guided by flanged bars 114 which are secured to the table and extend longitudinally of and adjacent the respective edges of the conveyer. In their travel about the wheel 38 the books are guided by an overhanging segmental guard 115 which is located adjacent the curvilinear path of the conveyer.

As each successive book on the conveyer reaches a vertical position at the left of the wheel 38 and below the guard 115, the book is pushed from the conveyer upon a horizontal table 116 and into a suitable assembling chamber 117 in such a manner that the books, with the corresponding ends of succeeding books oppositely disposed in relation to each other, are arranged face to face. The table, which extends at right angles to the main table, is supported by standards 118 rising from the bed. On the table 116 is a frame structure providing the chamber 117, whereof the end adjacent the wheel 38 is open and the opposite end is closed, as at 119. This chamber extends longitudinally of the conveyer, and is of a capacity to receive and support a prescribed number of books placed face to face. One side of the chamber is constituted by a retracted plunger head 120 which is reciprocable through the chamber at predetermined intervals, and the opposite side of the chamber communicates with a guide chamber which will be hereinafter described. Such opposite side is partially closed by a series of depending yielding gates which are arranged in such spaced relation to the retracted plunger as to support the ends of the books as and when they are pushed into the chamber. The gates preferably comprise finger-like members 121 which are pivotally hung on a rod 122 on the top wall of the chamber, and are maintained yieldingly down by suitably-disposed torsion springs 123 on the rod.

When the desired number of books have been ejected from the conveyer 36 and introduced into the chamber, the plunger head is advanced in a manner to push the opposing row of books out of the chamber in opposition to the resilient action of the gates, which gates, upon the retraction of the plunger resume their normal position.

The preferred means for pushing the books consecutively from the conveyer and into the chamber comprises a pair of parallel plunger bars 124 slidably mounted in guides 125 formed in the bifurcated upper end of a standard 126. These bars are loosely connected to the up-standing arms of a pair of bell-crank levers 127 which are fulcrumed on studs 128 supported on the standard. The other arms of the levers are connected to a vertical slide 129 mounted in a cam casing 130 on the standard, which slide is provided with a lateral cam roll 131 entered in the race of a face cam 132 within the casing. This cam is fast on a shaft 133 which has its bearings in the standard and in the wall of the casing, and is provided with a sprocket wheel 134 that is connected with a similar wheel 135 on the shaft 63 by means of a chain 136. Thus the cam 132 is continuously rotated. The contour of the cam race is such that during each dwell of the conveyer 36 the slide 129 is reciprocated in a manner to rock the levers 127 and thus reciprocate the plunger bars 124.

To maintain each succeeding book in upright position and parallel to the acting ends of the plunger bars when the book is positioned below the guard preparatory to and during the removal of the book from the conveyer, I preferably provide a depending dog 137 which is pivoted, as at 138, to the top of the frame of chamber 117, and is held normally adjacent the conveyer by means of a suitably-disposed spring 139. The dog, thus bearing yieldingly against the outer side of the opposing book, is swung upward by the force of the book when the latter is being pushed outward and into the assembling chamber, but the dog immediately resumes its normal or down position when the book escapes the same.

The plunger head 120 preferably comprises a bar of substantially the same length as the row of books contained in the chamber, and of a height substantially equal to the width of a book. The acting face of the bar is formed with spaced vertical grooves or serrations 140 which are successively engaged by the contiguous end of each book as it is advanced step by step into the chamber by the plunger bars. The walls of the grooves thus tend to support the books laterally and maintain them in upright position when they are initially entered into and also when they are being progressively advanced along the chamber.

The head is formed on a body 141 provided with ways 142 which are fitted to guides 143 in a pair of parallel cam members 144 bolted to the top of the table 116. The body is formed with a longitudinally extending opening 145 and is provided with a cross-portion 146 which overhangs the end of the opening adjacent the head. Within the opening is mounted an escapement member comprising, in the present instance, a block 147 whereof one end underlies the cross-portion and is pivoted in the side walls of the opening, as at 148. The opposite end of the block is bifurcated and provided with a shaft 149 the ends of which extend freely through and beyond arcuate slots 150 in the respective side walls. These outer ends bear anti-friction rolls 151 which travel in longitudinal cam-ways in the cam members 144. The cam-ways comprise horizontal portions 152 terminating at their forward ends in upwardly inclined portions 153, whereby the rolls as they travel in the latter during the forward movement of the plunger head swing the block 147 upward on its axis, and then in the return stroke of the head the block is caused to resume its down position. The shaft 149 carries an anti-friction roll 154 against which a vibratory dog 155 periodically impinges in a manner to move the plunger head forward and thus push the row of books from the chamber, as hereinafter explained.

The plunger head just described is maintained normally in retracted position by means of a stout spring 156, one end of which is secured to the bed 39 and the other end to a strap 157, which, passing about a pulley 158 at the end of the table, is connected to a rod 159 on the body 141. The rod is guided in a bearing block 160 on the table, and a suitable buffer 161, of rubber or the like, is mounted on the rod to abut against the block when the plunger body is retracted.

The dog 155 above referred to, is pivoted to the upper arm 162 of a trigger lever and is yieldingly held in up-standing position in relation to the arm by means of a suitably disposed spring 163. The lever is fulcrumed on a shaft 164 which is supported at its ends by two standards 165 on the bed. These standards are bolted at their upper ends to the underside of the table 116 and thus serve to sustain the latter.

The lower arm 166 of the lever bears an anti-friction roll 167 which is held in operative contact with an appropriate cam 168 by means of a spring 169 that is secured at one end to the bed and at the other end to a strap 170 which, passing about a suitably-disposed guide pulley 171, is secured to a clevis 172 on the upper arm of the lever. The cam 168 is fast on a shaft 173 having its bearing in a standard 174 on the bed. On the shaft is a worm wheel 175 with which meshes a worm 176 on a shaft 177, the latter shaft bearing a sprocket wheel 178 which is connected by means of a chain 179 with a similar wheel 180 on the shaft 63. By this arrangement of gearing the shaft 173 and its cam 168 are continuously driven. The contour of the cam surface 181 is such that in a part of its rotation the lever arm 166 is gradually moved outward against the retractive force of the spring 169 until the extreme high point (182) of the cam surface escapes the roll 167, whereupon the arm 166 is quickly thrown to its previous position by the retraction of the spring, as seen in Fig. 4. This done the lever arm 166 is again gradually moved outward, and released, and so on. The outward movement of the arm 166 is effected by the cam while the chamber 117 is being supplied with book-matches by the charging plungers 124. When a predetermined number of books have been entered in the chamber the cam escapes the roll as above mentioned and the upper arm of the lever is thus quickly thrown forward; the dog 155 on such arm thus impinging against the roll 154 on the pivoted block 147 and projecting the plunger structure 141 bodily forward in a manner to eject the complete row of books from the chamber 117.

In the forward movement of the plunger to a sufficient extent to push the row of books from the chamber, the rolls 151 of the block 147 travel in the straight portions 152 of the camways, whereupon such rolls enter the inclined portions 153 of the ways and thus raise the free end of the block 147 above the path of the dog. Immediately upon the retraction of the plunger to its original position by the spring 156 the cam 168 proceeds to move the lower arm of the lever gradually outward as before. The upper arm swings backward by actuation of the cam, and the dog tilts on its pivot (as seen in Fig. 26) so as to ride idly beneath the block 147.

The guide chamber into which the successive rows of books are delivered from the assembling chamber is of proper dimensions to receive and support a plurality of rows of books. Such guide chamber preferably comprises two spaced-apart sides 183 and a top portion 184, the sides being longitudinally slotted, as at 185, so as to facilitate the removal, by hand, of each leading row of books preparatory to packing the books in cartons or the like. The top portion 184 includes a sheet of transparent material 186 through which the rows of books contained within the guide chamber can be readily observed.

It is to be understood that my invention is not limited to the specific construction herein disclosed, as the mechanisms may be modified within the principle of the invention and the scope of the appended claims.

I claim—

1. In a machine for assembling match books and the like, the combination with means for impelling a succession of flat-lying articles with their head portions primarily located adjacent to and longitudinally of one side of the path of travel, of means for bodily inverting the alternate articles during their travel and thereby positioning their head portions adjacent to and longitudinally of the opposite side of the said path.

2. In a machine for assembling match books and the like, the combination with a conveyer having a succession of pockets adapted to receive and support flat-lying articles with their head portions adjacent one longitudinal edge of the conveyer, of means for bodily inverting the alternate articles upon the conveyer and thereby positioning their head portions adjacent to and longitudinally of the opposite side of the conveyer.

3. In a machine for assembling match books and the like, the combination with means for impelling a succession of flat-lying articles with their head portions primarily located adjacent to and longitudinally of one side of the path of travel, of means for engaging one end of each alternate article and gradually inverting it upon the conveyer thereby positioning its head portion adjacent to and longitudinally of the opposite side of the conveyer.

4. In a machine for assembling match books and the like, the combination with means for impelling a succession of flat-lying articles with their head portions primarily located in the same path, means for shifting the alternate articles lengthwise to project their ends beyond the corresponding ends of the adjacent articles, means for engaging the projecting ends of the said alternate articles and bodily inverting the latter during their travel thereby positioning them with their head portions in opposite relation to the head portions of the adjacent articles.

5. In a machine for assembling match books and the like, the combination with means for impelling a succession of flat-lying articles with their head portions primarily located in the same path, of means for shifting the alternate articles lengthwise to project their ends beyond the corresponding ends of the adjacent articles, and an element constructed and arranged to receive the projecting ends of the articles and bodily invert them during their travel, thereby positioning the said alternate articles with their head portions in opposite relation to the head portions of the adjacent articles.

6. In a machine for assembling match books and the like, the combination with means for impelling a succession of flat-lying articles with their head portions primarily located in the same path, of means for shifting the alternate articles lengthwise to project their ends beyond the corresponding ends of the adjacent articles, and a cam element diagonally overhanging the path of the articles and arranged to receive the projecting ends of the articles and bodily invert them during their travel.

7. In a machine for assembling match books and the like, the combination with means for impelling a succession of flat-lying articles with their head portions primarily located in the same path, of means for shifting the alternate articles lengthwise to project their ends beyond the corresponding ends of the adjacent articles, a cam element diagonally overhanging the path of the articles and arranged to receive the projecting ends of the articles and bodily invert them during their travel, and yielding means for maintaining said articles in place during their initial engagement with the cam element.

8. In a machine for assembling match books and the like, the combination with means for impelling a succession of flat-lying articles with their head portions primarily located in the same path, of means for shifting the alternate articles lengthwise to project their ends beyond the corresponding ends of the adjacent articles, a cam element diagonally overhanging the path of the articles and arranged to engage the projecting ends of the articles and bodily invert them during their travel, and yielding means for maintaining said articles in place during their initial engagement with the cam element, said means including a series of pivotally mounted plates arranged at intervals apart above and in angular relation to the path of travel of the articles.

9. In a machine for assembling match books and the like, the combination with a conveyer having pockets to receive and support a series of flat-lying books with their head portions primarily supported in the same path, of means for shifting the alternate articles lengthwise to project their ends beyond the corresponding ends of the adjacent articles, a cam element diagonally overhanging the path of the articles and arranged to engage the projecting ends of the articles and bodily invert them during their travel, and a series of pivotally mounted plates arranged at intervals apart above and in angular relation to the path of travel of the articles when they are initially engaged with the cam element.

10. In a machine for assembling match books and the like, the combination with a conveyer for impelling a succession of flat-lying articles with their head portions located in the same path, of a second conveyer laterally adjacent to and movable concurrently with the first conveyer, means for ejecting the articles successively from the first conveyer to the second conveyer, and means, including a longitudinally extending cam element, for bodily inverting the alternate articles on the second conveyer during their travel.

11. In a machine for assembling match books and the like, the combination with a conveyer for impelling a succession of flat-lying articles with their head portions primarily located in the same path, of a rotary arm to engage alternate articles and shift them transversely of the conveyer, means for actuating said arm, and a cap-plate overhanging the arm and the article in the path of the arm.

12. In a machine for assembling match books and the like, the combination with an intermittently movable conveyer for impelling a succession of flat-lying articles with their head portions primarily located in the same path, of a rotary arm to engage alternate articles and shift them transversely of the conveyer, means for intermittently rotating said arm, and means for temporarily locking the arm during each dwell thereof.

13. In a machine for assembling match books and the like, the combination with an endless conveyer having a horizontal upper run and a downwardly flexed delivery portion, and having pockets to support a series of articles in flat position, of means for ejecting the successive articles radially from the conveyer when they are brought to a vertical position by the flexed portion of the conveyer.

14. In a machine for assembling match books and the like, the combination with an endless conveyer having a horizontal upper run and a downwardly flexed delivery portion, and having pockets to support a series of articles in flat position, of an assembling chamber adjacent the delivery portion of the conveyer, and means for ejecting the successive articles from the conveyer and entering them into said chamber when they are brought to a vertical position by the flexed portion of the conveyer.

15. In a machine for assembling match books and the like, the combination with an endless conveyer having a horizontal upper run and a downwardly flexed delivery portion, and having pockets to support a series of articles in flat position, of an assembling chamber adjacent the delivery portion of the conveyer, means for ejecting the successive articles from the conveyer and entering them into said chamber when they are brought to a vertical position by the flexed portion of the conveyer, and means for periodically ejecting the articles from said chamber.

16. In a machine for assembling match books and the like, the combination with an endless conveyer having a horizontal upper run and a downwardly flexed delivery portion, and having pockets to support a series of articles in flat position, of means for ejecting the successive articles radially from the conveyer when they are brought to a vertical position by the flexed portion of the conveyer, said means including a pair of arms which embrace the conveyer and engage the respective ends of each succeeding article, and means for reciprocating said arms at predetermined intervals.

17. In a machine for assembling match books and the like, the combination with an endless conveyer having a horizontal upper run and a downwardly flexed delivery portion, and having pockets to support a series of articles in flat position, of an assembling chamber adjacent the delivery portion of the conveyer, means for ejecting the successive articles from the conveyer and entering them into said chamber when they are brought to a vertical position by the flexed portion of the conveyer, a plunger reciprocative transversely of said chamber, and means for periodically actuating said plunger to eject the articles from said chamber.

18. In a machine for assembling match books and the like, the combination of an assembling chamber, means for supplying articles successively thereto, a plunger reciprocable within and transversely of said chamber, a spring connection for normally maintaining said plunger in retracted position, means for actuating said plunger with a quick forward stroke in opposition to the force of the spring connection when a certain number of articles are assembled in the chamber, and trip devices constructed and arranged to release the plunger at the end of its forward stroke.

19. In a machine for assembling match books and the like, the combination of an assembling chamber, a plunger reciprocative within and transversely of the said chamber, means for normally maintaining said plunger in retracted position, an escapement member mounted on the plunger, trigger mechanism, including a vibratory dog adapted to impinge against said member and force the plunger forward, and means for actuating said mechanism with a rapid forward and a gradual return movement.

20. In a machine for assembling match books and the like, the combination of an assembling chamber, a plunger reciprocative within and transversely of the said chamber, means for normally maintaining said plunger in retracted position, a pivoted member mounted on said plunger, trigger mechanism, including a vibratory dog adapted to impinge against said member and force the plunger forward, means for actuating said mechanism with a rapid forward and a gradual return movement, and a stationary cam which co-operates with the said member to swing the latter into and out of the path of the dog at predetermined intervals.

21. In a machine for assembling match books and the like, an assembling chamber, means for progressively feeding articles thereto, a plunger reciprocable transversely of said chamber, said plunger including a bar having its active surface serrated to engage the contiguous ends of the articles within the chamber, and means whereby said plunger is reciprocated when a predetermined number of articles are assembled in the chamber.

22. In a machine for assembling match books and the like, the combination with an endless conveyer having a horizontal upper run and a downwardly flexed delivery portion, and having pockets to support a series of articles in flat position, of an assembling chamber adjacent the delivery portion of the conveyer, a yielding member to support the successive articles when they are brought to a vertical position by the flexed portion of the conveyer, and means for forcibly ejecting from the conveyer the articles thus positioned and entering them into the assembling chamber.

23. In a machine for assembling match books and the like, the combination with an endless conveyer having a horizontal upper run and a downwardly flexed delivery portion, and having pockets to support a series of articles in flat position, of an assembling chamber adjacent the delivery portion of the conveyer, a yielding member to support the successive articles when they are brought to a vertical position by the flexed portion of the conveyer, a plunger reciprocable transversely of said chamber, said plunger including a bar having its active surface serrated to engage the contiguous ends of the articles within the chamber, and means whereby said plunger is reciprocated when a predetermined number of articles are assembled in the chamber.

24. In a machine for assembling match books and the like, the combination with an endless conveyer having a horizontal upper run and a downwardly flexed delivery portion, and having pockets to support a series of articles in flat position, of an assembling chamber adjacent the delivery portion of the conveyer, a yielding member to support the successive articles when they are brought to a vertical position by the flexed portion of the conveyer, means for forcibly ejecting from the conveyer in opposition to said member the articles thus positioned and entering them into the assembling chamber, a plunger reciprocative transversely of said chamber, and means for periodically actuating said plunger to eject the articles from said chamber.

Signed at New York, in the county and State of New York this 7th day of August, A. D. 1922.

JOSEPH E. ZOMNIR.